(12) United States Patent  
Furuya et al.

(10) Patent No.: US 9,172,201 B2
(45) Date of Patent: Oct. 27, 2015

(54) WAVELENGTH CONVERSION LASER LIGHT SOURCE, AND IMAGE DISPLAY DEVICE

(75) Inventors: Hiroyuki Furuya, Kumamoto (JP); Tomoya Sugita, Nara (JP); Nobuyuki Horikawa, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 52 days.

(21) Appl. No.: 14/001,985

(22) PCT Filed: Feb. 28, 2012

(86) PCT No.: PCT/JP2012/001355
§ 371 (c)(1),
(2), (4) Date: Aug. 28, 2013

(87) PCT Pub. No.: WO2012/124266
PCT Pub. Date: Sep. 20, 2012

(65) Prior Publication Data
US 2013/0335813 A1    Dec. 19, 2013

(30) Foreign Application Priority Data

Mar. 17, 2011   (JP) ................................ 2011-058835

(51) Int. Cl.
*H01S 3/00* (2006.01)
*G02F 1/37* (2006.01)
(Continued)

(52) U.S. Cl.
CPC .............. *H01S 3/0092* (2013.01); *G02B 27/01* (2013.01); *G03B 21/204* (2013.01);
(Continued)

(58) Field of Classification Search
USPC ............................... 359/326–332; 372/21–22
See application file for complete search history.

(56) References Cited

U.S. PATENT DOCUMENTS 4,617,666 A * 10/1986 Liu .................................. 372/22
4,809,291 A *  2/1989 Byer et al. ...................... 372/75
(Continued)

FOREIGN PATENT DOCUMENTS

| JP | 1-220879  | 9/1989  |
| JP | 5-145160  | 6/1993  |
| JP | 5-167166  | 7/1993  |
| JP | 6-21554   | 1/1994  |
| JP | 6-132596  | 5/1994  |
| JP | 6-342949  | 12/1994 |
| JP | 7-131101  | 5/1995  |

(Continued)

OTHER PUBLICATIONS

International Search Report issued Mar. 27, 2012 in International (PCT) Application No. PCT/JP2012/001355.

*Primary Examiner* — Daniel Petkovsek
(74) *Attorney, Agent, or Firm* — Wenderoth, Lind & Ponack, L.L.P.

(57) ABSTRACT

A wavelength conversion laser light source, includes: a solid laser medium; a wavelength conversion element; a concave mirror on which a first reflecting surface reflecting a fundamental light wave and a the second harmonic light wave is formed; and a wavelength plate on which a second reflecting surface reflecting the fundamental light wave and transmitting the second harmonic light wave is formed, wherein a laser resonator is constituted by the first reflecting surface and the second reflecting surface; the solid laser medium is arranged on a first reflecting surface side of the laser resonator, the wavelength plate is arranged on a second reflecting surface side of the laser resonator, and the wavelength conversion element is arranged between the solid laser medium and the wavelength plate; and the wavelength plate outputs the second harmonic wave, to the exterior of the laser resonator, via the second reflecting surface.

10 Claims, 13 Drawing Sheets

(51) Int. Cl.
  *G02B 27/01* (2006.01)
  *H01S 3/08* (2006.01)
  *H01S 3/109* (2006.01)
  *G03B 21/20* (2006.01)
  *G02F 1/35* (2006.01)
  *H01S 3/0941* (2006.01)
  *H01S 3/23* (2006.01)
  *H01S 3/04* (2006.01)
  *G02F 1/1362* (2006.01)

(52) U.S. Cl.
  CPC ............ *H01S 3/08068* (2013.01); *H01S 3/109* (2013.01); *G02F 1/37* (2013.01); *G02F 2001/136281* (2013.01); *G02F 2001/3503* (2013.01); *H01S 3/0401* (2013.01); *H01S 3/08054* (2013.01); *H01S 3/09415* (2013.01); *H01S 3/2383* (2013.01)

(56) References Cited

U.S. PATENT DOCUMENTS

| | | | | |
|---|---|---|---|---|
| 4,910,740 | A | | 3/1990 | Oka |
| 5,249,190 | A | * | 9/1993 | Kortz et al. ..................... 372/22 |
| 5,289,479 | A | * | 2/1994 | Oka et al. ........................ 372/22 |
| 5,377,212 | A | * | 12/1994 | Tatsuno et al. .................. 372/22 |
| 5,511,085 | A | | 4/1996 | Marshall |
| 5,802,086 | A | * | 9/1998 | Hargis et al. .................... 372/22 |
| 5,940,419 | A | * | 8/1999 | Xie ................................. 372/22 |
| 5,949,802 | A | * | 9/1999 | MacKinnon et al. ............ 372/22 |
| 8,073,024 | B2 | * | 12/2011 | Yanagisawa et al. ............ 372/22 |
| 8,456,734 | B2 | * | 6/2013 | Horikawa et al. .............. 359/328 |
| 2010/0202477 | A1 | | 8/2010 | Yanagisawa et al. |

FOREIGN PATENT DOCUMENTS

| | | |
|---|---|---|
| JP | 8-56042 | 2/1996 |
| JP | 10-506233 | 6/1998 |
| WO | 2009/016709 | 2/2009 |

\* cited by examiner

WAVELENGTH CONVERSION LASER LIGHT SOURCE, AND IMAGE DISPLAY DEVICE

TECHNICAL FIELD

The present invention relates to a wavelength conversion laser device and an image display device using the wavelength conversion laser device which converts a fundamental light wave emitted by a solid laser medium into a second harmonic light wave having a frequency higher than the frequency of the fundamental light wave.

BACKGROUND OF THE INVENTION

In the prior art, research has been carried out into converting light (a fundamental light wave) emitted from a laser medium, such as an Nd:YAG laser or an Nd:YVO$_4$ laser, into visible green light (a harmonic wave) and further converting the green light into ultraviolet light, by wavelength conversion using a non-linear optical effect. Consequently, a large number of wavelength conversion laser light sources which yield visible laser light or ultraviolet laser light have been developed and put into practical use. This visible laser light and ultraviolet laser light is used in applications such as light sources for material laser processing, laser displays, and the like.

FIG. 13 is a diagram showing a compositional example of a conventional wavelength conversion laser light source that employs Nd:YVO$_4$, which is a monocrystalline material.

The wavelength conversion laser light source 100 shown in FIG. 13 is an end-pumped type of laser light source in which pump light is input from an end face of the laser medium. A YVO$_4$ crystal, which is a monocrystalline material, is used for the solid laser medium 105. The pump light PL is generated by a pump light source 101, converted into parallel light by a collimating lens 103, and is then condensed into a solid laser medium 105 in a resonator 109 by a condensing lens 104.

A high-reflection optical film 105a which reflects 1060 nm-band light is formed on an end face of the solid laser medium 105, on the side where the pump light PL is incident, and a high-reflection optical film 106a which reflects 1060 nm-band light is formed on an end face of a concave mirror 106. The resonator 109 is composed by the high-reflection optical film 105a and the high-reflection optical film 106a.

Here, an anti-reflection optical film (not illustrated) is formed on the end face 105b which is the surface of the solid laser medium 105 on the surface opposite to the wavelength conversion element 107, and on both end faces 111 of the wavelength conversion element 107. In other words, an anti-reflection optical film is formed on the surface of the solid laser medium 105 opposing the wavelength conversion element 107 and the surface of the wavelength conversion element 107 opposing the solid laser medium 105. Since the light resonates between the high-reflection optical film 105a formed on the solid laser medium 105 and the high-reflection optical film 106a formed on the end face of the concave mirror 106, then the resonator 109 operates as an optical resonator and laser light in the 1060 nm waveband is generated.

In this case, when the 1060 nm-band light thus generated passes through the wavelength conversion element 107, the wavelength of the 1060 nm-band light is converted to obtain output light OL at 530 nm, which is half the wavelength. The 530 nm output light OL thus converted is output externally from the end face of the wavelength conversion element 107 and via the concave mirror 106. The solid laser medium 105 is held by a laser medium holding tool (not illustrated).

Normally, in order to convert the wavelength of light using a wavelength conversion element, it is necessary for the 1060 nm-band light, which is the fundamental light wave, to be linearly polarized light. Since the YVO$_4$ crystals which are used as the solid laser medium 150 shown in FIG. 13 are a material having optical anisotropy, then by aligning the input and emission faces of the solid laser medium 105 in a plane which contains both the a axis and the c axis of the crystal axes, it is possible to obtain the generated 1060 nm-band light as linearly polarized light.

As described above, in a wavelength conversion laser light source, it is possible to carry out wavelength conversion based on a non-linear optical effect only in respect of light having a certain particular direction of polarization, and therefore in order to improve the output of the laser light source, it is important that the light emitted from the solid laser medium is linearly polarized light. With a material having anisotropy in the crystal structure, such as the Nd:YVO$_4$ described above, it is possible to directly obtain polarized light simply by selecting the axial orientation of the monocrystalline structure.

However, with an isotropic monocrystalline material, such as Nd:YAG, or a ceramic laser medium, even if the axial orientation of the solid laser medium is selected, it is not possible to ensure that the light emitted from the solid laser medium is directly polarized light.

In this way, in a YAG crystal or a solid laser medium using ceramic material, since there is no optical anisotropy, it is not possible to obtain directly polarized light if the composition shown in FIG. 13 is used directly without modification. Therefore, various compositions have been proposed in which a wavelength plate is inserted into a resonator in order to enable wavelength conversion, even when using a solid laser medium which does not have anisotropy.

For example, in a composition of a wavelength conversion laser light source such as an internal resonator type of wavelength conversion laser light source, there are examples where it has been proposed to employ an optical component such as a ¼ wavelength plate and to use all of the polarization directions emitted from the solid laser medium; for instance, there are the wavelength conversion laser light sources disclosed in Patent Documents 1 to 3 described below.

FIG. 14 is a schematic drawing showing a composition of a conventional first wavelength conversion laser light source which uses a wavelength plate, FIG. 15 is a schematic drawing showing a composition of a conventional second wavelength conversion laser light source and FIG. 16 is a schematic drawing showing a composition of a conventional third wavelength conversion laser light source using a wavelength plate.

Firstly, in Patent Document 1, as shown in FIG. 14, pump light generated from a pump light source 101 is converted into parallel light by an object lens 102, and is then input to a solid laser medium 105 via a reflecting mirror 110, and a resonator 204 is constituted by the reflecting mirrors 110 and 111. Furthermore, two wavelength conversion elements 107 and 108 and a wavelength plate 203 are provided inside the wavelength conversion laser light source and the direction of polarization of the harmonic laser beam generated by converting the light wavelength by one wavelength conversion element 107 is rotated by the wavelength plate 203 so as to coincide with the direction of polarization of the harmonic laser beam generated by converting the light wavelength by the other wavelength conversion element 108. Consequently, there is little variation in the direction of polarization with respect to temperature change in the device, and it is possible to obtain a laser beam having a stable output.

Thereupon, in Patent Document 2, as shown in FIG. 15, the pump light generated by the pump light source 101 is converted into parallel light by a collimating lens 103 and is then condensed in the solid laser medium 105 by the condensing lens 104, and a resonator 206 is constituted by the high-reflection optical film 105a and the reflecting mirror 111; output light OL which is a second harmonic wave is output externally via the reflecting mirror 111 and the wavelength filter 210.

Here, the resonance mode in the resonator 206 of the wavelength conversion laser light source is constituted by two intrinsic polarization modes in which the laser light of the fundamental wave is mutually orthogonal. By resonating operation in a randomly polarized state where there is no correlation in the phase relationship between these two intrinsic polarization modes, and also inserting a λ/4 wavelength plate 203 in the resonator 206, exchange of energy via the generation of the second harmonic wave does not occur between the two intrinsically polarized light beams which are mutually orthogonal. Thereby, it is possible to generate second harmonic laser light which is sufficiently stable for practical application, readily by a simple composition.

Next, Patent Document 3 proposes preventing positional displacement due to the heat of respective optical elements constituting a resonator by arranging the optical elements independently on a prescribed substrate, and discloses that, of these optical components, a resonator 207 is constituted by a high-reflection film 205a and a high-reflection optical film 107a, as shown in FIG. 16, and the resonator 207 uses an optical component 205 which combines a wavelength plate and a lens.

A method such as that described above has been proposed already and with the conventional wavelength conversion laser light source described above, it is possible to raise the conversion efficiency from the fundamental light wave to the harmonic wave, and it is possible to stabilize the output.

However, it is known that, if a wavelength plate is inserted into the resonator in order to stabilize the output from the wavelength conversion laser light source, and if the input pump light is made large in order to raise the light output from the wavelength conversion laser light source, as in the prior art example described above, then problems occur in that the light output that ought to be achieved according to the design is not obtained, or the light output becomes instable. More specifically, it is clear that the effect of stabilizing output is not sufficient if the contents of the prior art example described above are simply implemented directly.

FIG. 17 is a plot diagram of the output characteristics of a conventional wavelength conversion laser light source, in which the horizontal axis represents the input intensity of the pump light and the vertical axis represents the output intensity of green light, which is the output light of the wavelength conversion laser light source. FIG. 18 is a schematic drawing showing a composition of a conventional wavelength conversion laser light source from which the output characteristics shown in FIG. 17 were measured.

As shown in FIG. 18, the pump light PL output from the pump light source 101 passes through the collimating lens 103 and the condensing lens 104 and is input into the solid laser medium 105. The high-reflection optical film 105a which reflects the 1064 nm waveband for constituting a laser resonator is formed on one end face of the solid laser medium 105, and a laser resonator is composed by the high-reflection optical film 105a and the high-reflection optical film 106a of the concave mirror 106. Upon passing through the wavelength conversion element 107, the 1064 nm light (fundamental light wave) which is generated inside the laser resonator is converted to 532 nm, which is half the wavelength, and is radiated externally as output light OL from the concave mirror 106. The wavelength plate 203 is inserted between the solid laser medium 105 and the wavelength conversion element 107.

The plot diagram shown in FIG. 17 was obtained as a result of measuring the output characteristics of a conventional wavelength conversion laser light source composed as described above. As shown in FIG. 17, when the pump light input is 1.5 W or greater (when the green light output is 200 mW), the output starts to become instable and if the pump light input becomes 3 W or greater (when the green light output is 500 mW or greater), then it is evident that, in addition to instability of the output, the green light output diverges by approximately 15% from the predicted output value based on calculation (calculation value).

Patent Document 1: Japanese Patent Application Publication No. H5-167166

Patent Document 2: Japanese Patent Application Publication No. H1-220879

Patent Document 3: Japanese Patent Application Publication No. H8-56042

SUMMARY OF THE INVENTION

The object of the present invention is to provide a wavelength conversion laser light source and an image display device which is capable of outputting a second harmonic wave after wavelength conversion, at high output and in a stable fashion, even in cases where a wavelength plate is inserted into the laser resonator.

The wavelength conversion laser light source according to one aspect of the present invention comprises: a solid laser medium to which pump light is input and which generates a fundamental light wave; a wavelength conversion element which converts the fundamental light wave into a second harmonic light wave having a higher frequency than the frequency of the fundamental light wave; a concave mirror on which a first reflecting surface reflecting the fundamental light wave and the second harmonic light wave is formed; and a wavelength plate on which a second reflecting surface reflecting the fundamental light wave and transmitting the second harmonic light wave is formed; wherein a laser resonator is constituted by the first reflecting surface and the second reflecting surface; the solid laser medium is arranged on the first reflecting surface side of the laser resonator, the wavelength plate is arranged on the second reflecting surface side of the laser resonator, and the wavelength conversion element is arranged between the solid laser medium and the wavelength plate; and the wavelength plate outputs the second harmonic wave which has been converted by the wavelength conversion element, to the exterior of the resonator, via the second reflecting surface.

An image display device relating to a further aspect of the present invention comprises: a laser light source which includes the wavelength conversion laser light source described above and generates laser light; a modulation element which forms an image by modulating the laser light; and a controller which controls the laser light source and the modulation element.

According the present invention, even if a wavelength plate is inserted into the laser resonator, it is possible to output the second harmonic wave after wavelength conversion, at a high output and in a stable fashion.

DETAILED DESCRIPTION OF THE INVENTION

Figure 1:
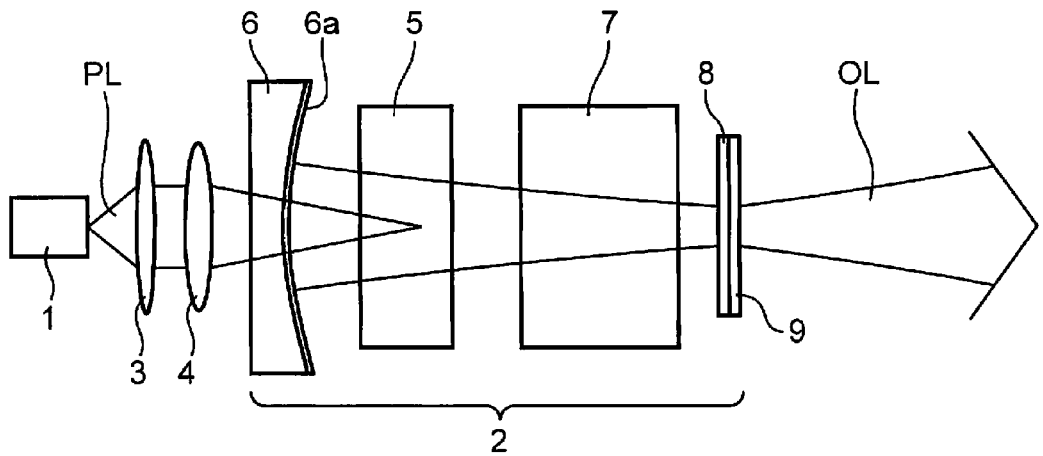
FIG. 1 is a schematic drawing showing the composition of a wavelength conversion laser light source according to a first embodiment of the present invention.

Below, a wavelength conversion laser light source relating to respective embodiments of the present invention is described with reference to the drawings. The same members in the drawings are labeled with the same reference numerals and in this case description thereof is omitted.

First Embodiment

FIG. 1 is a schematic drawing showing the composition of a wavelength conversion laser light source according to a first embodiment of the present invention. The wavelength conversion laser light source shown in FIG. 1 includes: a pump light source 1, a collimating lens 3, a condensing lens 4, a solid laser medium 5, a concave mirror 6, a wavelength conversion element 7, a λ/4 wavelength plate 8 and an optical film 9.

The wavelength conversion laser light source shown in FIG. 1 is an end-pumped type of laser light source in which pump light is input from an end face of the laser medium. The pump light PL is generated by the pump light source 1, is converted into parallel light by the collimating lens 3, and is then condensed into the solid laser medium 5 arranged inside the laser resonator 2 by the condensing lens 4.

The laser resonator 2 includes a solid laser medium 5 and a wavelength conversion element 7, and an isotropic monocrystalline material or ceramic laser medium, or the like, is used for the solid laser medium 5. The solid laser medium 5 which has received the condensed pump light generates a fundamental light wave and outputs the fundamental light wave to the wavelength conversion element 7. The wavelength conversion element 7 converts the fundamental light wave into a second harmonic wave which has a higher frequency than the fundamental light wave.

Figure 13:
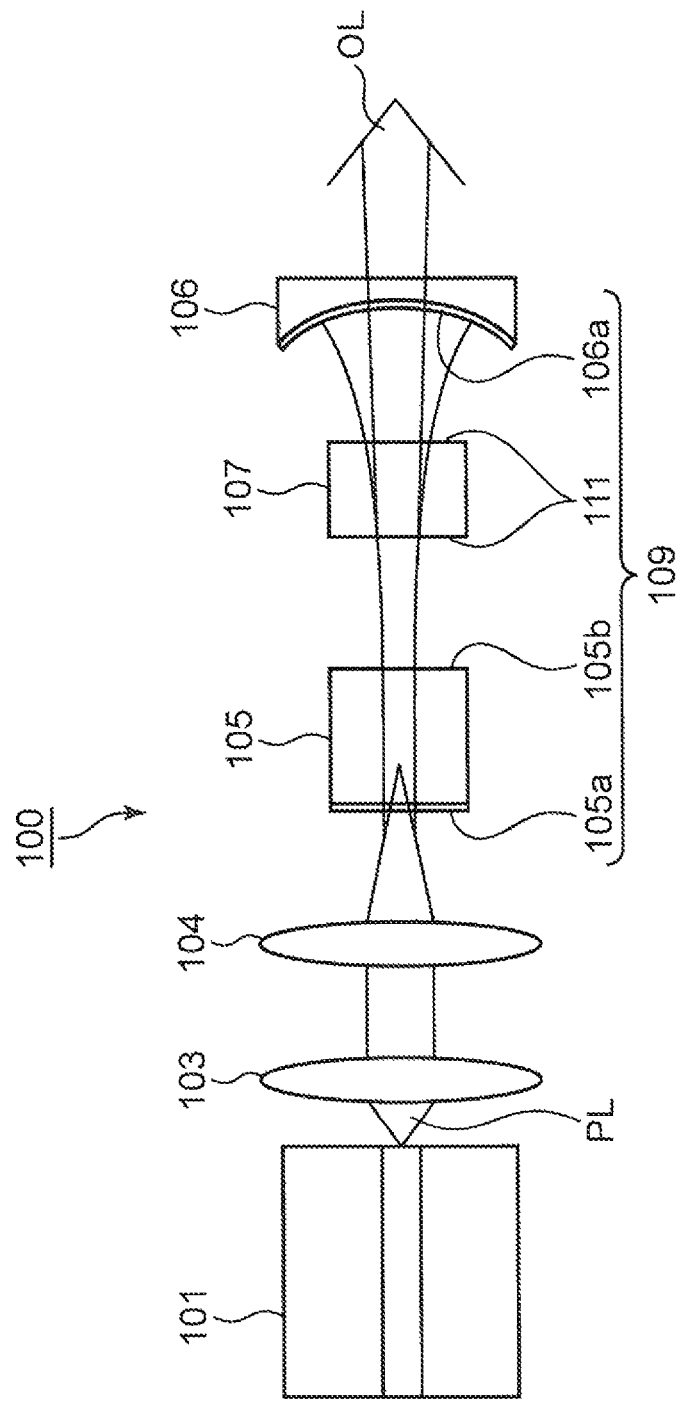
FIG. 13 is a diagram showing an example of the composition of a conventional wavelength conversion laser light source.
Figure 14:
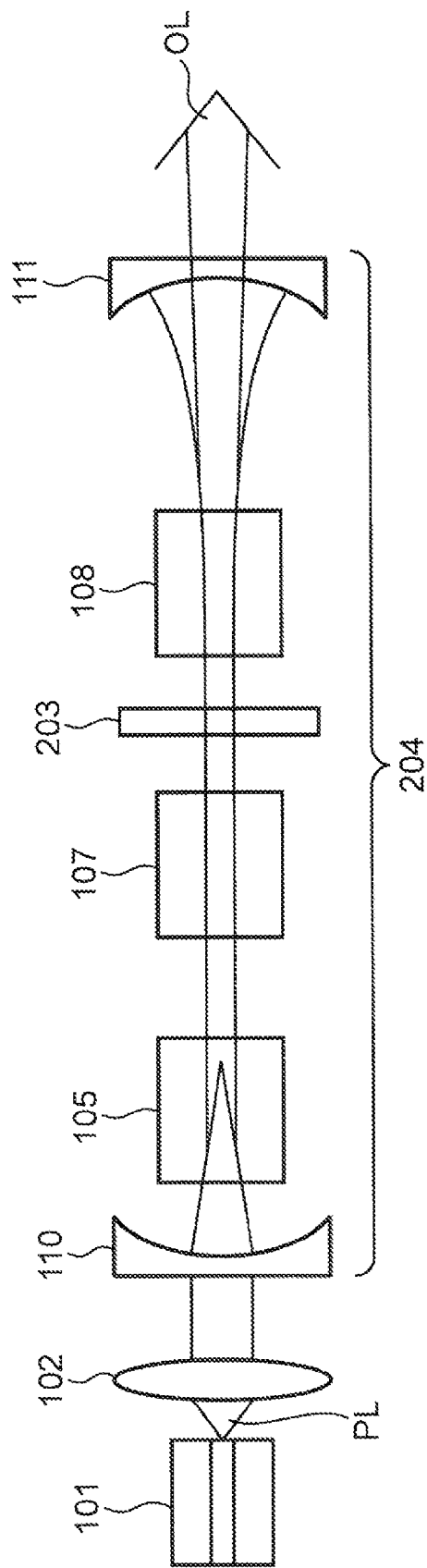
FIG. 14 is a schematic drawing showing the composition of a conventional first wavelength conversion laser light source which uses a wavelength plate.
Figure 15:
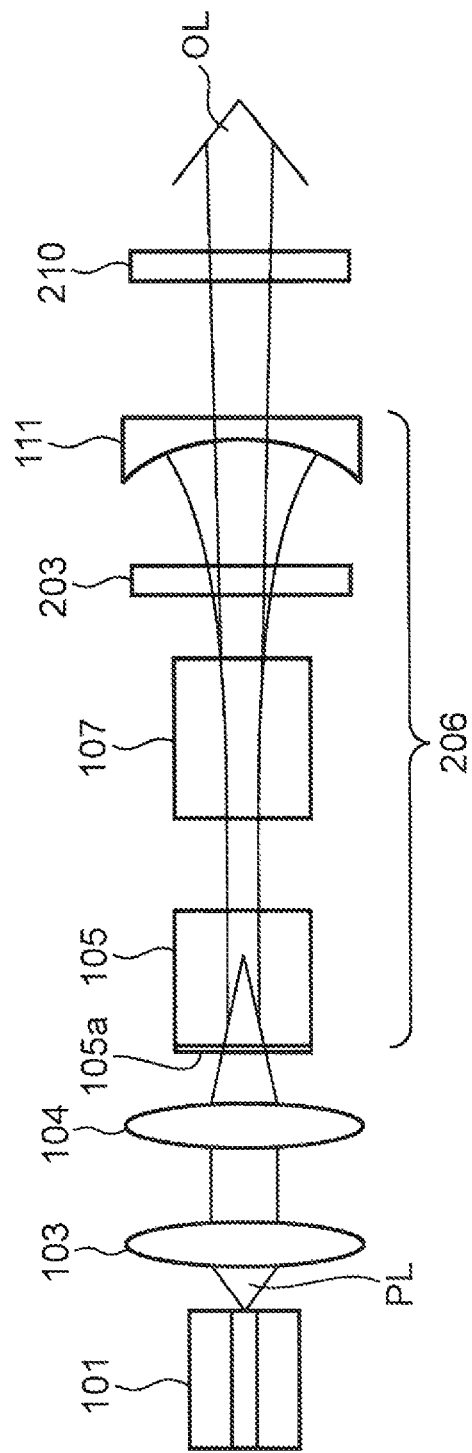
FIG. 15 is a schematic drawing showing the composition of a conventional second wavelength conversion laser light source which uses a wavelength plate.
Figure 16:
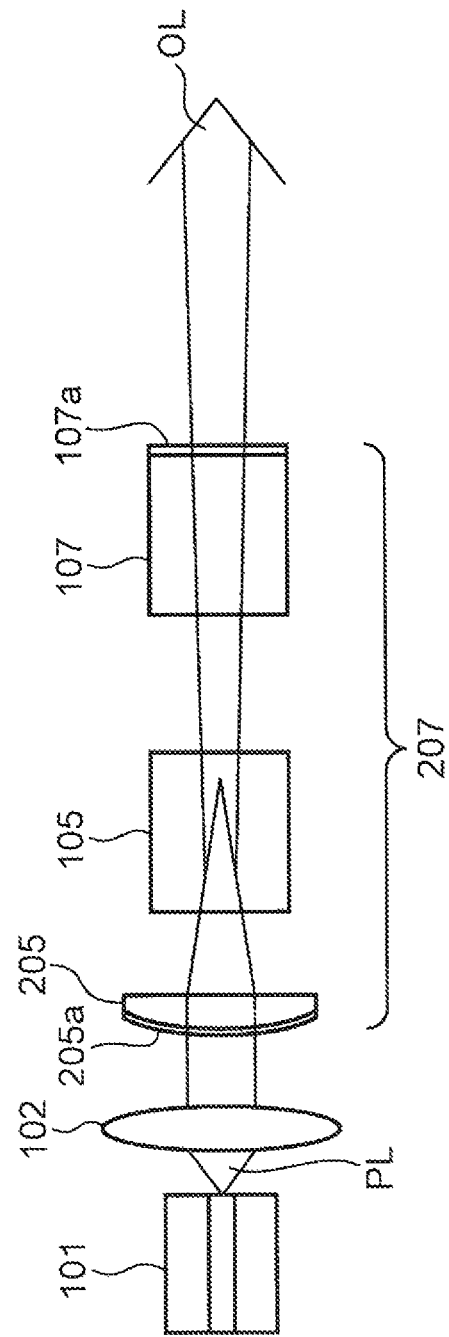
FIG. 16 is a schematic drawing showing the composition of a conventional third wavelength conversion laser light source which uses a wavelength plate.

Here, the point of difference between the present embodiment and the conventional wavelength conversion laser light source shown in FIG. 13 is the fact that, of the mirrors which constitute the laser resonator 2, a concave mirror 6 is arranged on the side closer to the pump light source 1 where the pump light PL is input, and a λ/4 wavelength plate 8 on which an optical film 9 is formed and which functions as an output mirror is arranged on the output side of the output light OL.

A high-reflection optical film 6a which is a first reflecting surface that reflects the 1060 nm-band light (fundamental light wave) generated from the solid laser medium 5, and the 530 nm-band light which is a harmonic thereof (second harmonic wave), is formed on the end face of the concave mirror 6 on the side of the solid laser medium 5. The concave mirror 6 reflects the 1060 nm-band light by the high-reflection optical film 6a and condenses this light inside the solid laser medium 5. Furthermore, an optical film 9 which reflects the 1060 nm-band light generated from the solid laser medium 5 and transmits the 530 nm-band light which is a harmonic of the 1060 nm-band light, is formed as an output mirror at the end face on the output side of the λ/4 wavelength plate 8. The λ/4 wavelength plate 8 has a flat plate shape, the optical film 9 formed on the λ/4 wavelength plate 8 also has a flat plate shape, and the optical film 9 functions as a planar mirror which forms a second reflecting surface.

The end face of the concave mirror 6 (the high-reflection optical film 6a) and the end face of the λ/4 wavelength plate 8 (optical film 9) are composed in such a manner that an optical laser resonator 2 is formed therebetween, and the 1060 nm-band light performs laser oscillation. Every time the 1060 nm-band light performing laser oscillation passes through the wavelength conversion element 7, a portion of the 1060 nm-band light is converted into 530 nm-band light, which is a harmonic wave. The 530 nm-band light of which the wavelength has been converted is finally output to the exterior of the laser resonator 2 from the optical film 9 formed on the end face of the λ/4 wavelength plate 8, which forms an output mirror. In this way, the solid laser medium 5 is arranged on the high-reflection optical film 6a side of the laser resonator 2, the λ/4 wavelength plate 8 is arranged on the optical film 9 side of the laser resonator 2, and the wavelength conversion element 7 is arranged between the solid laser medium 5 and the λ/4 wavelength plate 8.

In the present embodiment, to give one example of a material used to make the wavelength conversion element 7, MgO-doped lithium niobate having a cyclical polarization reversal structure was selected. Furthermore, similar beneficial effects are obtained if the non-linear optical material in the wavelength conversion element 7 uses MgO-doped lithium tantalate, MgO-doped lithium niobate having a fixed ratio composition, MgO-doped lithium tantalate having a fixed ratio composition or potassium titanyl phosphate (commonly called "KTP", "KTiOPO$_4$"), or the like, rather than the MgO-doped lithium niobate having a cyclical polarization reversal structure.

Here, the causes of instability and decline in the output of the conventional wavelength conversion laser light source described above will be explained. The present inventors discovered the causes indicated below, as a result of carrying out thorough investigation into the causes of instability and decline in the output of a conventional wavelength conversion laser light source.

Figure 17:
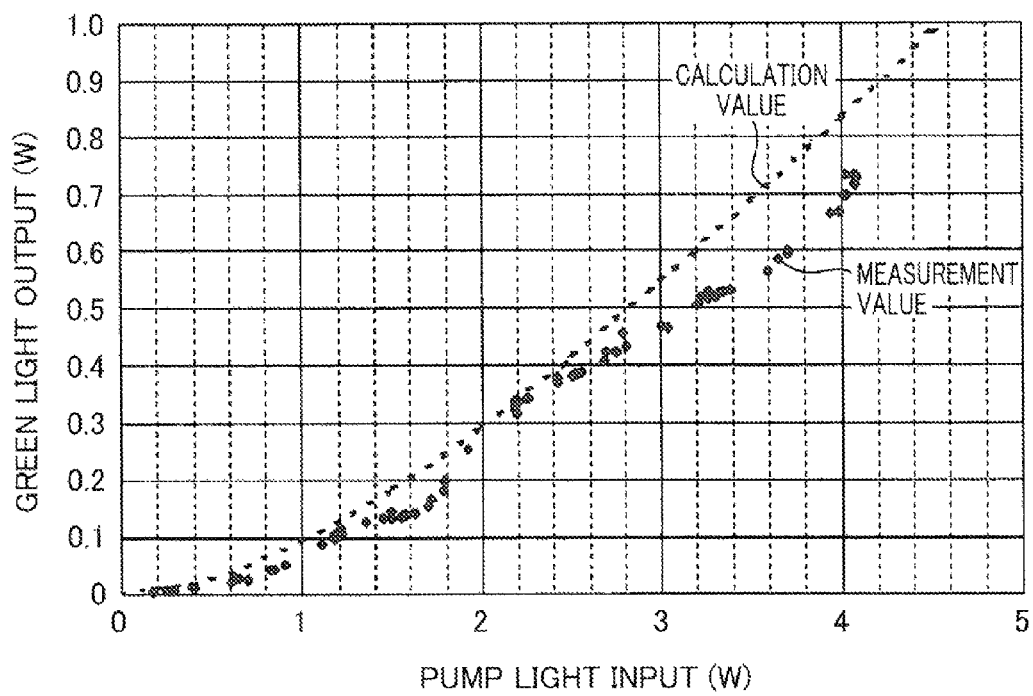
FIG. 17 is a diagram plotting the green light output with respect to the pump light input in a conventional wavelength conversion laser light source.
Figure 18:
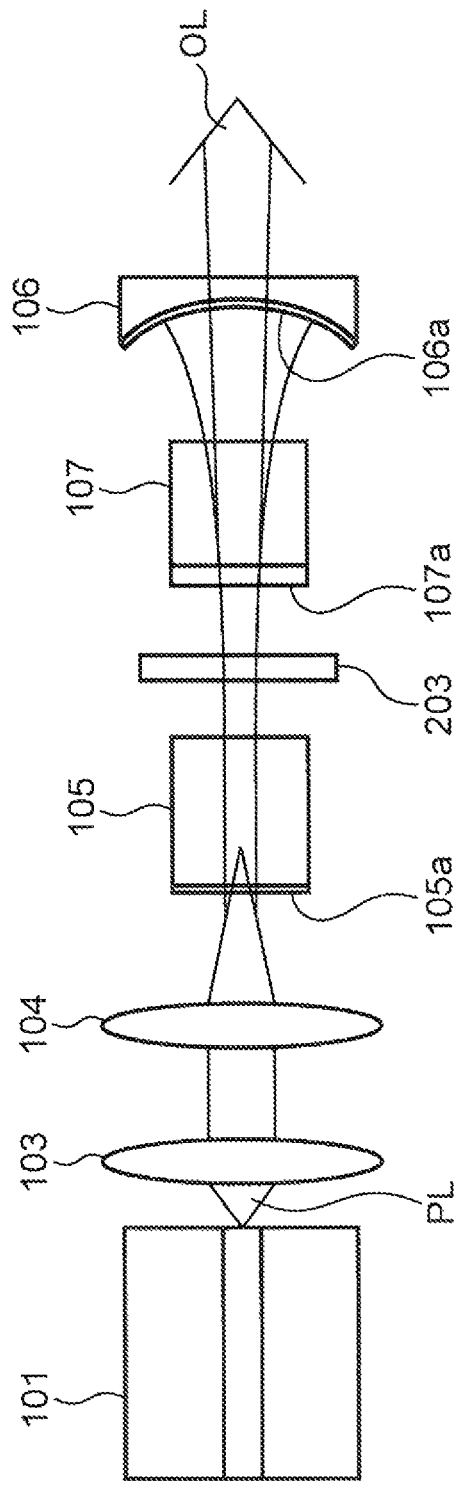
FIG. 18 is a schematic drawing showing a composition of a conventional wavelength conversion laser light source in which the output characteristics shown in FIG. 17 are measured.

The solid laser medium 105 is made from a material which has no anisotropy, as in the conventional wavelength conversion laser light source shown in FIG. 18 and described above, and in the wavelength conversion laser light source into which the wavelength plate 203 has been inserted, there are two problems as the pump light input is raised, namely, (1) there is divergence between the estimated output value based on the design (the calculation value), and the actual output value; and (2) the output becomes instable. Therefore, it is clear that the countermeasures described in the prior art examples alone are not sufficient to stabilize the output and a graph which plots this situation is shown in FIG. 17.

To give a further description of FIG. 17, the horizontal axis represents the input power of pump light which is generated by the pump light source 101 shown in FIG. 18 and which is input to the solid laser medium 105, and the vertical axis represents the output power of green light which is output from the wavelength conversion laser light source shown in FIG. 18. Furthermore, the dotted line indicates the estimated output value which is estimated on the basis of the design (calculation value), and the black circular dots are the actual measurement values which are actually output. For example, when the pump light input is 4 W, it is calculated that green light of 800 mW or greater ought to be output, but it can be seen that only about 700 mW is output. Apart from this point, when the pump light input is in the vicinity of 1.5 W, instability of the output involving fluctuation of the output value is observed, and a phenomenon is observed in which the actual measurement value diverges from the estimated output value.

Here, if the pump light input is 4 W and the green light output is equal to or lower than the estimated output value, then when the wavelength plate 203 is rotated to control the amount of rotation of the wavelength, a phenomenon is observed whereby the green light output tends to be restored the moment that the wavelength plate 203 is rotated, but then declines again to the original level of 700 mW after approximately 10 or more seconds. Therefore, the wavelength plate 203 is considered to be a cause of instability and decline in the output.

Figure 2:
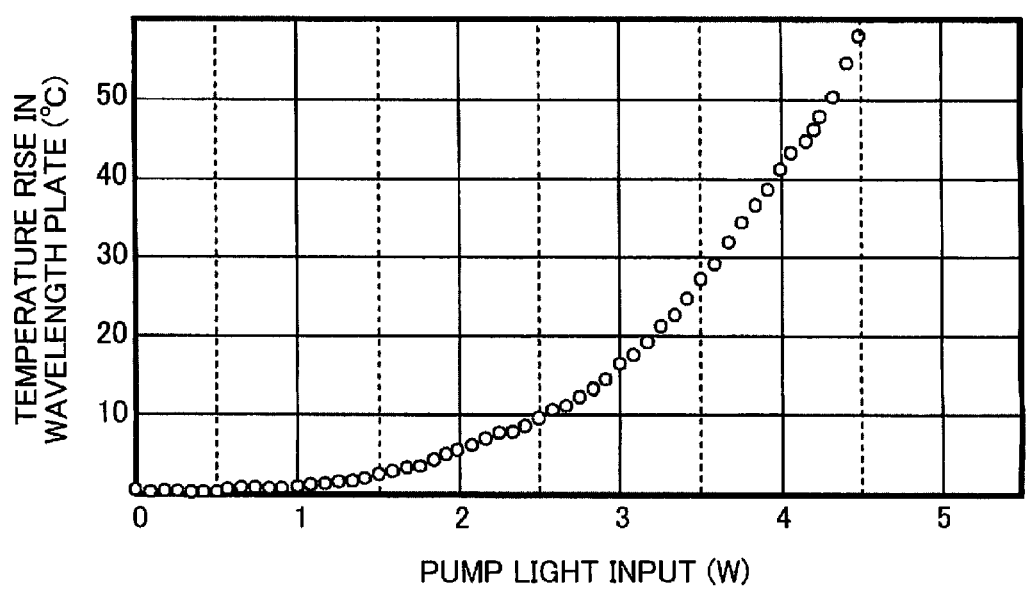
FIG. 2 is a diagram plotting the temperature rise of the wavelength plate with respect to the pump light input.

Next, FIG. 2 shows the results of measuring the temperature rise of the wavelength plate 203 which is inserted inside the resonator, by a radiation thermometer. From FIG. 2, as a result of measurement at a position distanced by approximately 1 mm from the position where the laser beam passes, it became clear that the temperature of the wavelength plate 203 rises as the pump light input increases.

Therefore, the cause of temperature rise in the wavelength plate 203 was investigated. Inside the resonator, the possible energy sources which have sufficiently large power (1 W or greater) for heating the wavelength plate 203, which is an optical element, are the pump light (808 nm) for pumping the solid laser medium 105 and the fundamental light wave (1064 nm) which is generated by the solid laser medium 105.

Furthermore, in the composition of the conventional wavelength conversion laser light source shown in FIG. 18, a similar temperature rise was confirmed, even in a state where a high-reflection optical film 107a which reflects the harmonic light (532 nm) is provided on the end face of the wavelength conversion element 107 and harmonic light is not input to the wavelength plate 203.

Figure 3:
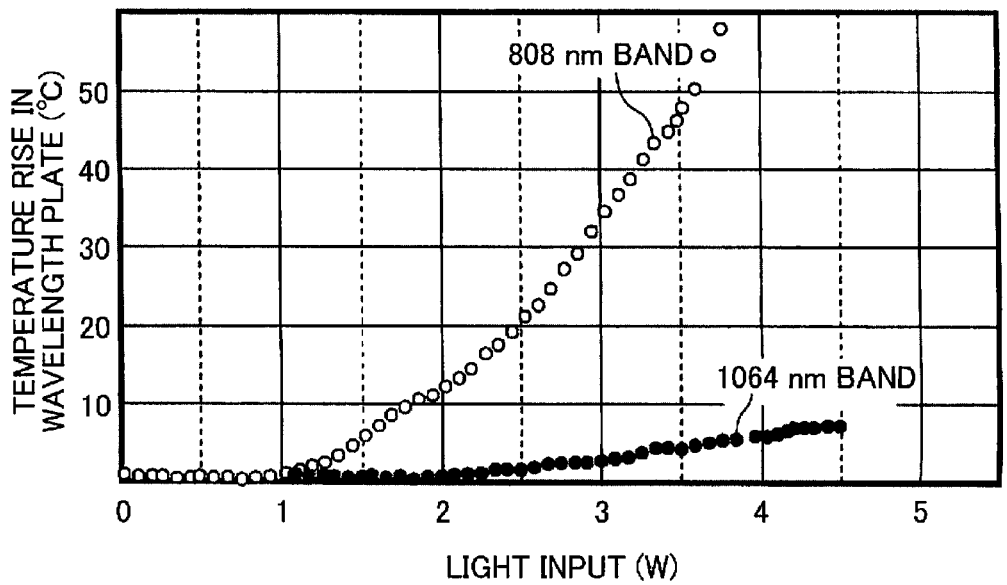
FIG. 3 is a diagram plotting the temperature rise of the wavelength plate in a case where 808 nm-band light and 1064 nm-band light is input to the wavelength plate.

The amount of heat generated by the wavelength plate 203 due to absorption of light was measured for the pump light (808 nm) and the fundamental light wave (1064 nm). The amount of generated heat that was measured was not the amount of heat generated by the whole wavelength plate 203, but rather the amount measured with a radiation thermometer in a ring shape at a position distanced by about 300 μm from the position where the beam (pump light or fundamental light wave) passes. The results of this are shown in FIG. 3. As shown in FIG. 3, it can be seen that the temperature rise in the wavelength plate 203 was greater with the pump light (808 nm) than with the fundamental light guide (1064 nm). In other words, the dominant factor in the temperature rise occurring in the wavelength plate 203 was found to be absorption of the pump light (808 nm) rather than the fundamental light wave (1064 nm).

In other words, it became clear that the cause of instability in the light output from the wavelength conversion laser light source and the fact that a smaller output than expected is obtained, is the temperature characteristics of the wavelength plate 203, and more specifically, the λ/4 wavelength plate.

One method of improving the temperature characteristics of the λ/4 wavelength plate is to use a wavelength plate known as a "zero-order" plate, but this plate is extremely thin and is difficult to handle during processing and assembly, in addition to which the tolerable range of temperature change is a narrow range of approximately 5° C. to 10° C., and therefore simply using a zero-order wavelength plate does not provide a solution. Moreover, a possible solution might be to use a high-purity quartz material in order to reduce the light absorption of a quartz material which constitutes a λ/4 wavelength plate, but with a quartz material of this kind, the rate of crystal growth is slow and therefore the material is expensive, which is problematic in cost terms.

Based on the aforementioned clarification of the causes of instability and decline in the output, the present embodiment proposes a composition in which good characteristics are obtained even if a zero-order wavelength plate or a high-purity quartz material is not used, and the same applied to the second embodiment below, and so on.

More specifically, in the present embodiment, since a λ/4 wavelength plate 8 is arranged on the side of the laser resonator 2 where the harmonic wave is output, in other words, in the laser resonator 2 at the position furthest distanced from the solid laser medium 5 into which the pump light is input, then hardly any of the pump light (808 nm), which has the greatest effect on decline in the output due to absorption, reaches the λ/4 wavelength plate 8. Therefore, it is possible to reduce temperature rise in the λ/4 wavelength plate 8 due to light absorption, and it is also possible to reduce the rotation of polarization caused by temperature rise in the λ/4 wavelength plate 8. As a result of this, it is possible further to reduce the phenomenon of instability in the laser light output from the wavelength conversion laser light source and the phenomenon of decline in the output from the expected output value.

Furthermore, in the present embodiment, the λ/4 wavelength plate 8 is arranged on the output side and an optical film 9 which reflects the fundamental light wave (1064 nm) and which transmits the second harmonic light (532 nm) that is a harmonic of the fundamental light wave is formed on the output-side end face of the λ/4 wavelength plate 8. Therefore, the optical film 9 formed on the λ/4 wavelength plate 8 functions as an output mirror. In this way, by arranging the λ/4 wavelength plate 8 on the output side, the λ/4 wavelength plate 8 is exposed to the outside air via the optical film 9, which is extremely thin, and the λ/4 wavelength plate 8 can be cooled by the outside air efficiently. Therefore, an action of suppressing the rotation of polarization due to temperature rise in the λ/4 wavelength plate 8 is produced, and it is possible to diminish the problems of instability of the output or shortfall in the output with respect to the expected output value.

Moreover, in the present embodiment, since a fundamental light wave is condensed by the high-reflection optical film 6a of the concave mirror 6 and the condensed light is input to the wavelength conversion element 7, then it is possible to improve the conversion efficiency from the fundamental light wave to the harmonic light in the wavelength conversion element 7, and furthermore since the optical film 9 on the optical side is a plane mirror, then it is possible readily to form the optical film 9 in an integrated fashion with the λ/4 wavelength plate 8, in addition to which the positions of the λ/4 wavelength plate 8 and the optical film 9 can be adjusted readily and the manufacturing costs of the device can be reduced.

Figure 4:
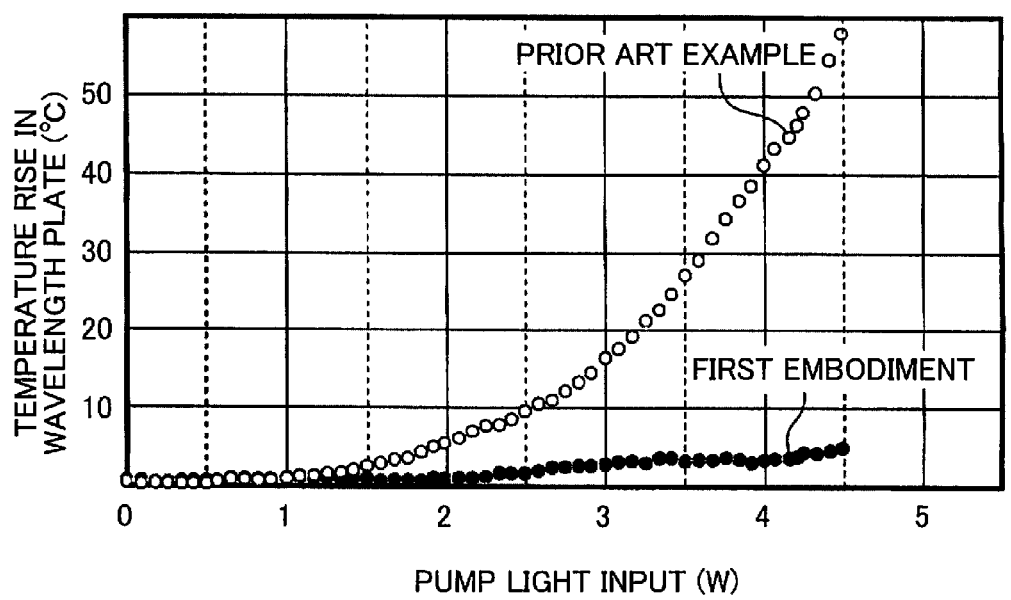
FIG. 4 is a diagram plotting the temperature rise the wavelength plate with respect to the pump light input, compared to a prior art example and the first embodiment.

FIG. 4 is a diagram which plots the temperature rise in the wavelength plate when used as a laser resonator, showing a comparison between the present embodiment (the black circles in FIG. 4) and a wavelength conversion laser light source shown in FIG. 18 which is a prior art example (the white circles in FIG. 4). As shown in FIG. 4, when the pump light input is 4 W, then in the prior art example, the temperature rise in the wavelength plate 203 was 40° C., whereas in the present embodiment, the temperature rise in the λ/4 wavelength plate 8 is restricted to 3° C. to 4° C. In this way, it can be seen that, in the present embodiment, the beneficial effect of diminishing the amount of light absorbed by the λ/4 wavelength plate 8 and the beneficial effect of cooling the λ/4 wavelength plate 8 by the outside air are sufficiently achieved.

Next, the results of actually outputting green light from the wavelength conversion laser light source according to the present embodiment will be explained.

Figure 5:
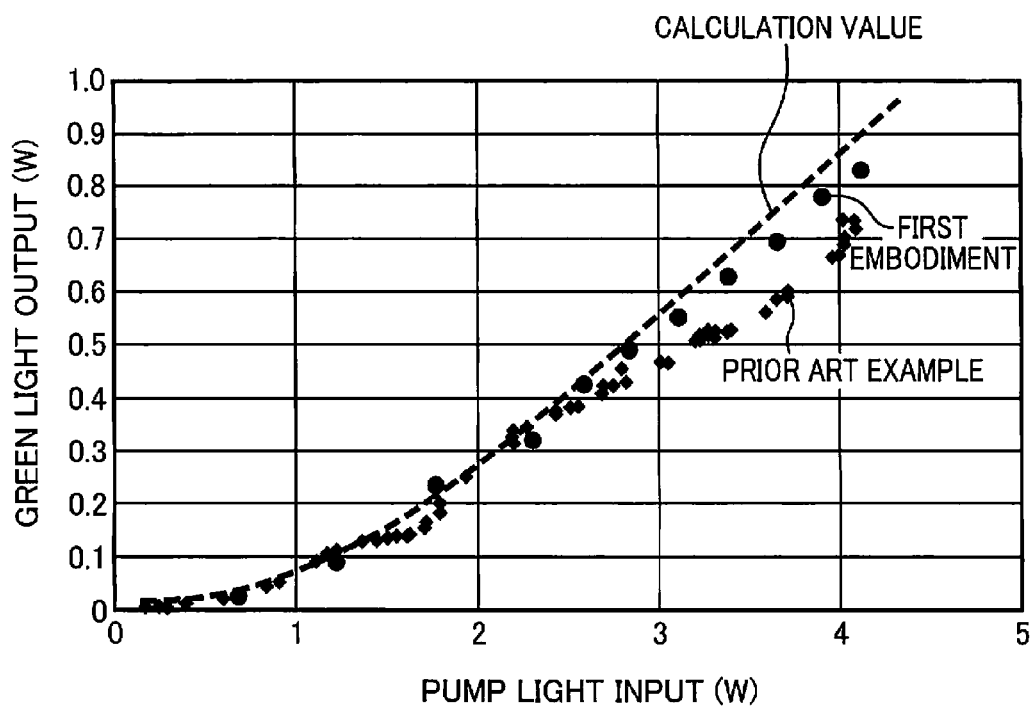
FIG. 5 is a diagram plotting the green light output with respect to the pump light input, compared to a prior art example and the first embodiment.

FIG. 5 is a diagram which plots the relationship between the green light output and the pump light input, showing a comparison between the present embodiment (the black circles in FIG. 5) and a wavelength conversion laser light source shown in FIG. 18 which is a conventional example (the small squares in FIG. 5). As shown in FIG. 5, in the prior art example, when the pump light input is 4 W, the green light output is 700 mW in relation to an expected output value of 850 mW (the calculation value indicated by the dotted line in FIG. 5) and hence it is only possible to output no more than 85% of the expected output value. On the other hand, in the present embodiment, when the input light input is 4 W, the green light output is 800 mW in relation to an expected output value of 850 mW, and hence the output performance is improved to such an extent that an output of approximately 95% with respect to the expected output value is obtained. Furthermore, the instability of the output observed in the vicinity of the pump light input surpassing 1.5 W involves an amount of fluctuation of no less than 20% in the prior art example, but is improved greatly to no more than 1% in the case of the present embodiment.

As described previously, in the present embodiment, even if an expensive wavelength plate such as a zero-order wavelength plate is not used, it is possible to achieve stabilization of the green light output which surpasses that when a zero-order wavelength plate is used, and the problem of instability of the output and shortfall in the output compared to the expected output value can be improved significantly.

Second Embodiment

Figure 6:
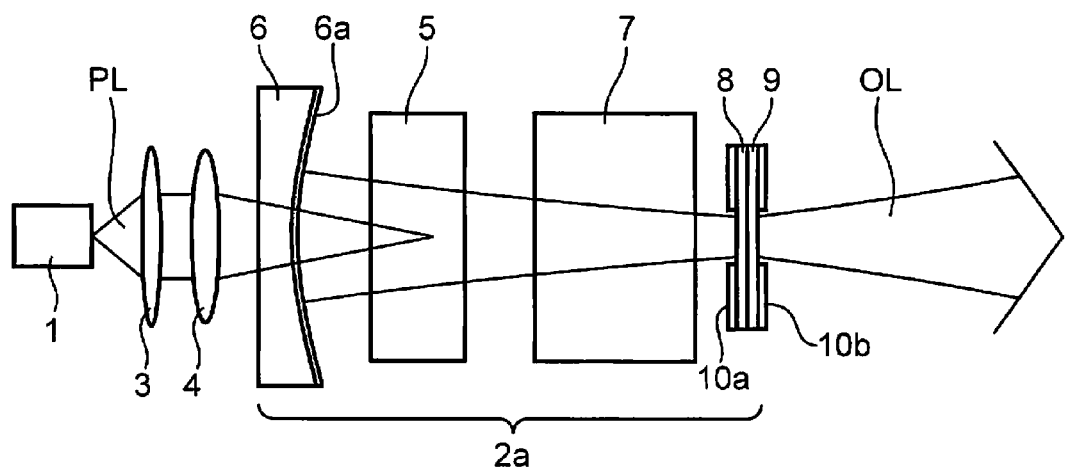
FIG. 6 is a schematic drawing showing the composition of a wavelength conversion laser light source according to a second embodiment of the present invention.

Next, a second embodiment of the invention will be described. FIG. 6 is a schematic drawing showing the composition of a wavelength conversion laser light source according to a second embodiment of the present invention. The wavelength conversion laser light source shown in FIG. 6 includes: a pump light source 1, a collimating lens 3, a condensing lens 4, a solid laser medium 5, a concave mirror 6, a wavelength conversion element 7, a λ/4 wavelength plate 8, an optical film 9 and cooling sections 10a and 10b.

The pump light PL is generated by the pump light source 1, is converted into parallel light by the collimating lens 3, and is then condensed into the solid laser medium 5 arranged inside the laser resonator 2a by the condensing lens 4. The laser resonator 2a includes a solid laser medium 5 and a wavelength conversion element 7, and monocrystalline Nd:YAG material or an optical ceramic material having a garnet structure, such as Nd:YAG, is used as the material of the solid laser medium 5.

Furthermore, for the material of the wavelength conversion element 7, a material which can form a polarization reversal structure is used, and various non-linear optical materials can be adopted, such as MgO-doped lithium tantalate, MgO-doped lithium niobate having a fixed ratio composition, MgO-doped lithium tantalate having a fixed ratio composition, potassium titanyl phosphate (commonly called "KTP", "KTiOPO$_4$"), or the like, rather than the MgO-doped lithium niobate.

The solid laser medium 5 which has received the condensed pump light generates a fundamental light wave and outputs the fundamental light wave to the wavelength conversion element 7. The wavelength conversion element 7 converts the fundamental light wave into a second harmonic wave which has a higher frequency than the fundamental light wave. In the present embodiment, for example, a Nd:YAG ceramic is used for the solid laser medium 5 and MgO:LiNbO$_3$ (MgO-doped lithium niobate) crystals having a cyclical polarization reversal structure are used for the wavelength conversion element 7.

Here, in the present embodiment, of the mirrors which constitute the laser resonator 2a, the concave mirror 6 is arranged on a side closer to the pump light source 1 where the pump light PL is input and the λ/4 wavelength plate 8 on which an optical film 9 is formed to function as an output mirror is arranged on the output side of the output light OL. Moreover, the λ/4 wavelength plate 8 has a flat plate shape, the optical film 9 formed on the λ/4 wavelength plate 8 also has a flat plate shape, the λ/4 wavelength plate 8 and the optical film 9 are sandwiched between the cooling sections 10a and 10b, and the optical film 9 functions as a plane mirror.

A high-reflection optical film 6a which reflects the 1060 nm-band light (fundamental light wave) generated from the solid laser medium 5, and the 530 nm-band light (harmonic light wave) which is a harmonic (second harmonic wave) thereof, is formed on the end face of the concave mirror 6 on the side of the solid laser medium 5. The concave mirror 6 reflects the 1060 nm-band light by the high-reflection optical film 6a and condenses this light inside the solid laser medium 5. Furthermore, an optical film 9 which reflects the 1060 nm-band light generated from the solid laser medium 5 and transmits the 530 nm-band light which is a harmonic of the 1060 nm-band light, is formed as an output mirror at the end face on the output side of the λ/4 wavelength plate 8. The end face of the concave mirror 6 (the high-reflection optical film 6a) and the end face of the λ/4 wavelength plate 8 (optical film 9) are composed in such a manner that an optical laser resonator 2a is formed therebetween, and the 1060 nm-band light performs laser oscillation.

Every time the 1060 nm-band light performing laser oscillation passes through the wavelength conversion element 7, a portion of the 1060 nm-band light is converted into 530 nm-band light, which is a harmonic wave. The 530 nm-band light of which the wavelength has been converted is finally output to the exterior of the laser resonator 2a from the optical film 9 formed on the end face of the λ/4 wavelength plate 8, which forms an output mirror.

Here, the point of difference of the present embodiment with respect to the first embodiment is that a cooling section 10a is provided on the end face on the wavelength conversion element 7 side of the λ/4 wavelength plate 8 which is provided on the output side, and a cooling section 10b is provided on the optical film 9 which is the output mirror.

Figure 7:
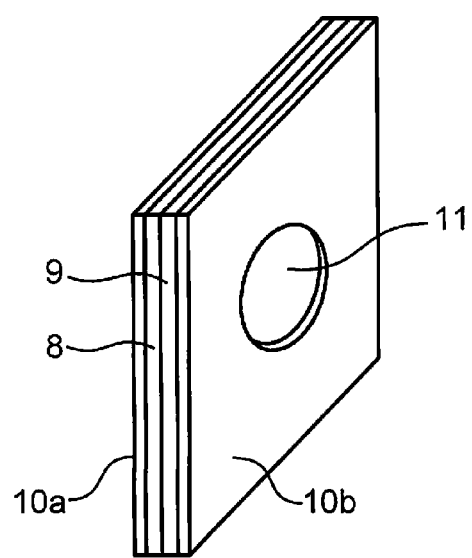
FIG. 7 is a schematic perspective diagram showing a composition of one example of a wavelength plate with cooling section which is used in the wavelength conversion laser light source shown in FIG. 6.

FIG. 7 is a schematic perspective diagram showing a composition of one example of a wavelength plate with cooling section which is used in the wavelength conversion laser light source shown in FIG. 6. The wavelength plate with cooling section shown in FIG. 7 includes a λ/4 wavelength plate 8, an optical film 9, and cooling sections 10a and 10b having circular opening sections 11 through which the laser beam (harmonic light wave) passes, and the cooling sections 10a and 10b are provided on the front and rear surfaces of the λ/4 wavelength plate 8 and the optical film 9 in such a manner that the λ/4 wavelength plate 8 and the optical film 9 are sandwiched between the cooling sections 10a and 10b.

The method of arranging the cooling sections is not limited in particular to the example described above, and it is also possible to provide a cooling section only on the front surface of the λ/14 wavelength plate 8 or to provide a cooling section only on the rear surface of the λ/4 wavelength plate 8 (on the front surface of the optical film 9); in either of these cases, although the cooling performance is inferior to that when cooling sections are provided on the front and rear surfaces, it is possible to obtain beneficial effects due to the cooling of the λ/4 wavelength plate 8.

A material having a thermal conductivity exceeding that of the quartz material constituting the λ/4 wavelength plate 8 is formed as a thin film on the surface of the λ/4 wavelength plate 8 and the optical film 9, in the portion apart from the circular opening section 11 through which the laser beam passes, and wavelength plate cooling sections made from this thermal conducting material in the form of a thin film are formed as the cooling sections 10a and 10b. For example, it is also possible to achieve a composition which obtains an even greater cooling effect by forming a metal film made of the materials indicated below on the surface of the λ/4 wavelength plate 8 and the optical film 9, as the cooling sections 10a and 10b.

Here, as a result of thorough research into metal materials which are used as the cooling sections 10a and 10b, it was found that there is an inversely proportional relationship between the thermal conductivity and the electrical resistivity of the metal, and there is a difference in the cooling performance depending on the resistance value. More specifically, cooling sections 10a and 10b were made respectively using indium (a coating of molten metal) which has an electrical resistivity of $8.75\times10^{-6}$ Ω·cm, aluminum (a sputtered film) which has an electrical resistivity of $2.74\times10^{-6}$ Ω·cm, gold (a sputtered film) which has an electrical resistivity of $2.20\times10^{-6}$ Ω·cm, copper (a surface-contact layer) which has an electrical resistivity of $1.70\times10^{-6}$ Ω·cm, DOTITE D-550 (by Fujikura Kasei Co., Ltd) which has an electrical resistivity of $8.0\times10^{-5}$ Ω·cm, tantalum (a sputtered film) which has an electrical resistivity of $13.1\times10^{-6}$ Ω·cm, and palladium (a sputtered film) which has an electrical resistivity of $10.6\times10^{-6}$ Ω·cm, and in each case the decline in the output of the green light of the wavelength conversion laser light source was measured.

As a result of the measurements described above, with indium (In), aluminum (Al), gold (Au) and copper (Cu) which have an electrical resistivity of no more than $1.0\times10^{-5}$ Ω·cm, the output of green light did not decline more than 5%, and with DOTITE D-550, tantalum (Ta) and palladium (Pd) which have an electrical resistivity exceeding $1.0\times10^{-5}$ Ω·cm, the rate of decline of output of green light stopped at 5%. As a result of this, the effect of suppressing decline in the output of the green light is confirmed in respect of indium (In), aluminum (Al), gold (Au) and copper (Cu), and it is known that decline in output can be suppressed in comparison with a case where there is no metal film, by forming a metal film from a material having electrical resistivity of $1.0\times10^{-5}$ Ω·cm or lower.

Furthermore, it is also possible to use a transparent conductive material for the cooling sections 10a and 10b instead of the metal film described above, and for instance, it is possible to form a diamond thin film or diamond-like carbon (DLC) on the surfaces of the λ/4 wavelength plate 8 and/or the optical film 9. The diamond thin film or the diamond-like carbon are able to transmit light, and therefore it is not necessary to provide a circular opening section for the laser beam (harmonic light wave) to pass through, in the cooling sections 10a and 10b, the cooling efficiency of the portion where the laser beam passes is improved, and hence this is a most desirable mode.

From the results of the investigation described above, in the present embodiment, a sputtered film of aluminum (having a thickness of 3000 Å) was formed on the λ/4 wavelength plate 8 and the optical film 9, as the cooling sections 10a and 10b, and the measurements indicated below were carried out.

Figure 8:
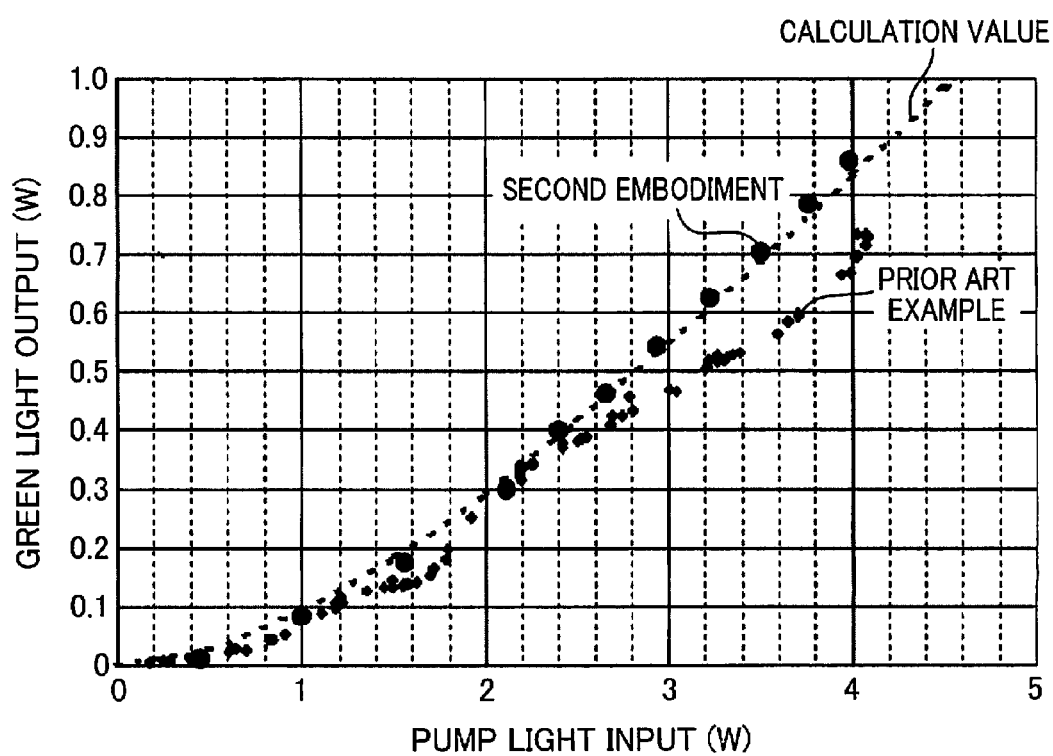
FIG. 8 is a diagram plotting the green light output with respect to the pump light input, compared to a prior art example and the second embodiment.

FIG. 8 is a diagram which plots the relationship between the green light output and the pump light input when the pump light of wavelength 808 nm is input up to 4 W, showing a comparison between the present embodiment (the black circles in FIG. 8) and a wavelength conversion laser light source shown in FIG. 18 which is a conventional example (the small squares in FIG. 8). As shown in FIG. 8, in the prior art example, the green light output is lower than the expected output value (the calculation value shown by the dotted line in FIG. 8), but in the present embodiment, it can be seen clearly that an output in line with the expected output value is obtained.

From the results described above, in the present embodiment, by forming the cooling sections 10a and 10b on the surface of the λ/4 wavelength plate 8 and the optical film 9, in addition to the beneficial effects of the first embodiment described above, it was possible to significantly improve the problem of instability of the output and shortfall in the output with respect to the expected output value, in a wavelength conversion laser light source in which a wavelength plate is inserted into a laser resonator.

Figure 9:
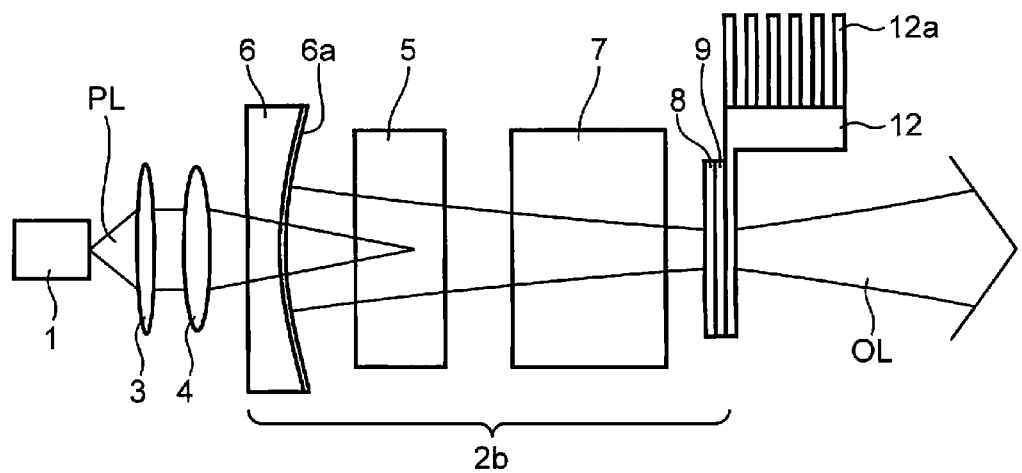
FIG. 9 is a schematic drawing showing the composition of a wavelength conversion laser light source which is a first modification of the second embodiment of the present invention.
Figure 10:
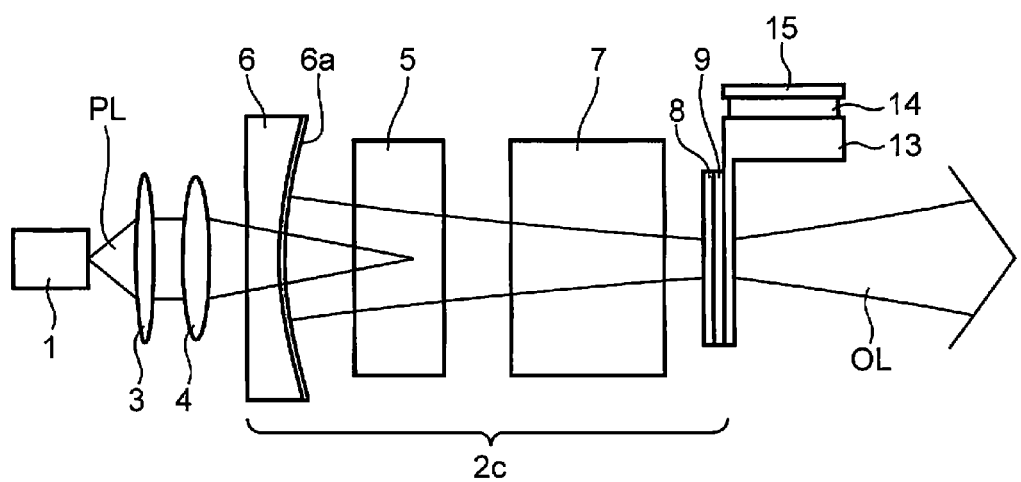
FIG. 10 is a schematic drawing showing the composition of a wavelength conversion laser light source which is a second modification of the second embodiment of the present invention.

Furthermore, as a further mode of the present embodiment, it is also possible to provide a compulsory cooling mechanism for the λ/4 wavelength plate 8. FIG. 9 is a schematic drawing showing a composition of a wavelength conversion laser light source which is a first modification example of the second embodiment of the present invention, and FIG. 10 is a schematic drawing showing a composition of a wavelength conversion laser light source which is a second modification example of the second embodiment of the present invention. Although not shown in the drawings, similarly to the cooling sections 10*a* and 10*b* of the wavelength conversion laser light source shown in FIG. 6, circular opening sections through which the laser beam (harmonic light wave) pass are provided in the wavelength plate cooling mechanisms 12 and 13 described below.

In the wavelength conversion laser light source shown in FIG. 9, a metal wavelength plate cooling mechanism 12 is provided on the optical film 9 side of the λ/4 wavelength plate 8, as a compulsory cooling mechanism for the λ/4 wavelength plate 8 inside the laser resonator 2*b*. In the wavelength plate cooling mechanism 12, heat radiating fins 12*a* in which a plurality of groove sections are formed are provided on the upper surface of an inverted L-shaped main body section. In this way, by providing heat radiating fins 12*a*, it is possible to enlarge the volume and the surface area of the portion that transmits heat, and therefore it is possible to raise the cooling efficiency of the λ/4 wavelength plate 8.

By adopting a composition such as that described above, the wavelength conversion laser light source shown in FIG. 9 is able to cool the λ/4 wavelength plate 8 more adequately compared to the wavelength conversion laser light source shown in FIG. 6, and therefore it is possible to improve on the cooling performance of the wavelength conversion laser light source shown in FIG. 6. As a result of this, in the wavelength conversion laser light source shown in FIG. 9, even in cases where it is wished to obtain a green light output of no less than 1 W, it was possible to improve the problem of instability in the output and shortfall in the output with respect to the expected output value.

Furthermore, in the wavelength conversion laser light source shown in FIG. 10, a metal wavelength plate cooling mechanism 13 is provided on the optical film 9 side of the λ/4 wavelength plate 8, as a compulsory cooling mechanism for the λ/4 wavelength plate 8 inside the laser resonator 2*b*. In the wavelength plate cooling mechanism 13, a Peltier element 14 is provided on the upper surface of an inverted L-shaped main body section and a metal heat radiating section 15 is provided on an upper surface of the Peltier element 14. The Peltier element 14 is driven by the drive circuit (not illustrated) and performs compulsory cooling of the λ/4 wavelength plate 8. In the wavelength conversion laser light source shown in FIG. 10, since the λ/4 wavelength plate 8 is cooled compulsorily, then it is possible to sufficiently improve the problem of instability in the output and shortfall in the output with respect to the expected output value, and a green light output of no less than 10 W can be obtained using a YAG monocrystalline laser.

Needless to say, it is also possible to form a composition for cooling the wavelength plate described in the present embodiment, on the λ/4 wavelength plate 8 according to the first embodiment.

Furthermore, when fixing the λ/4 wavelength plate 8 and the optical film 9 to the compulsory cooling mechanism, stress is applied to the λ/4 wavelength plate 8 and care must be taken to ensure that warping and distortion does not occur in the λ/4 wavelength plate 8.

For example, if there is stress or distortion in the λ/4 wavelength plate 8, then the amount of stress and distortion varies with the temperature, and a problem arises in that the output of the harmonic light wave fluctuates with the temperature. Therefore, it is desirable to form a plurality of grooves in the surfaces of the compulsory cooling mechanism which hold the λ/4 wavelength plate 8 (the end faces of the wavelength plate cooling mechanisms 12 and 13 which oppose the optical film 9). In this case, it is possible to release unwanted stress and distortion in the λ/4 wavelength plate 8, as well as being able to raise the cooling efficiency by increasing the surface area of the portions of the wavelength plate cooling mechanisms 12 and 13 which radiate heat, and therefore it is possible to improve the instability of the output with respect to temperature change.

Moreover, it is also possible to raise the cooling efficiency by increasing the radiation factor of the surface of the compulsory cooling mechanism, instead of increasing the surface area by arranging a plurality of fins as in the heat radiating fins 12*a*.

Furthermore, in the respective embodiments, the solid laser medium is not limited to particular materials, but desirably is composed from an isotropic material having an isotropic refractive index, such as ceramic, in which case the beneficial effects of the respective embodiments are further pronounced since the problems of instability and decline in the output of the wavelength conversion laser light source described above are particularly marked in this case.

Furthermore, similar beneficial effects to those described above are obtained even if a garnet type monocrystalline material, such as monocrystalline YAG (Yttrium-Aluminum-Garnet), or YAG ceramic, is used as the solid laser medium.

Moreover, even if the solid laser medium made from a ceramic material has the same chemical composition, there are materials which are manufactured so as to have a depolarization effect. In the solid laser medium having this depolarization effect, linearly polarized light becomes randomly polarized light upon passing through the solid laser medium. Consequently, if a solid laser medium is created from a ceramic material into which microcrystals having various crystalline orientations are integrated, then it is possible to generate a beneficial effect of converting the linearly polarized light into randomly polarized light. The respective embodiments described above are especially effective in the case of a solid laser medium which is created from a ceramic material having a depolarization effect of this kind.

Third Embodiment

Figure 11:
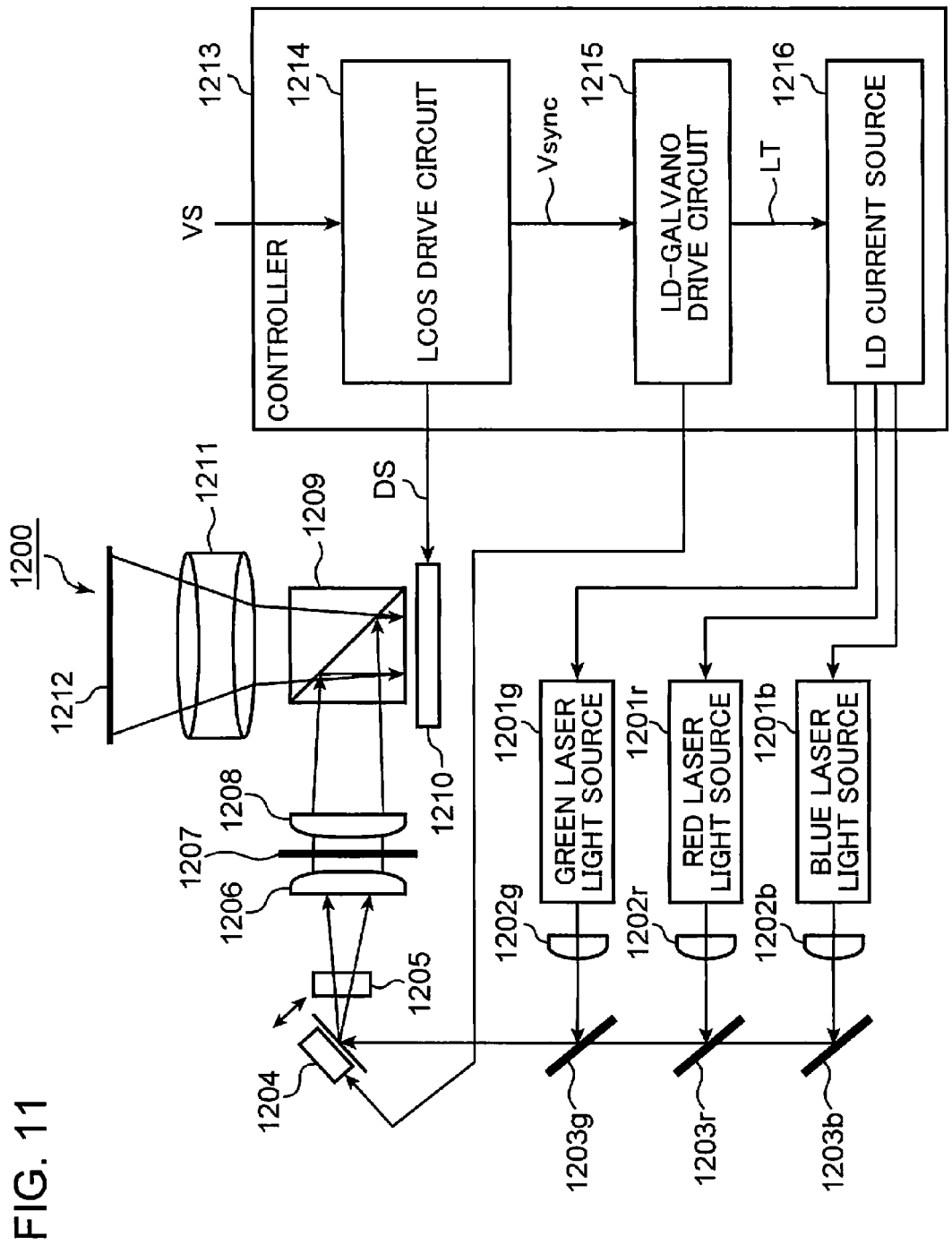
FIG. 11 is a schematic drawing showing a composition of a laser projector device which uses a wavelength conversion laser light source according to the first or second embodiment of the present invention.

Next, a third embodiment of the invention will be described. The present embodiment is a first image display device which adapts the wavelength conversion laser light source according to the first or second embodiment. FIG. 11 is a schematic drawing showing a composition of a laser projector device which uses a wavelength conversion laser light source according to the first or second embodiment of the present invention.

The laser projector device 1200 shown in FIG. 11 is a laser projector which uses a ferroelectric LCOS (Liquid Crystal On Silicon), and a wavelength conversion laser light source according to the first or second embodiment described above is used for a green laser light source 1201*g*.

As shown in FIG. 11, the laser light emitted from a blue laser light source 1201*b*, a red laser light source 1201*r* and a green laser light source 1201*g* is collimated into parallel light by collimating lenses 1202*r*, 1202*g* and 1202*b*. Mirrors 1203*r*, 1203*g*, and 1203*b* are dielectric multilayer mirrors which respectively have reflective characteristics in the red region (wavelength 600 nm or higher), the blue region (wavelength 400 nm to 460 nm) and the green region (wavelength 520 nm to 560 nm). The collimating lenses 1202r, 1202g and 1202b and the mirrors 1203r, 1203g and 1203b are adjusted in such a manner that the beam paths of the blue laser light source 1201b, the red laser light source 1201r and the green laser light source 1201g are coaxial immediately after the mirror 1203g.

A scanning mirror 1204 performs a scanning action of the beam in directions within the plane of the drawing, and a cylindrical lens 1205 shapes the beam into a straight bright line. A diffusing plate 1207 is arranged between the relay lens 1206 and the field lens 1208, and the beam which has been shaped into a bright line by the cylindrical lens 1205 is formed further into a band shape. The polarizing beam splitter 1209 functions as a prism and the LCOS panel 1210 is a ferroelectric liquid crystal display device (LCOS).

Here, the on/off switching of the LCOS panel 1210 is performed by turning the polarization direction of the light, and therefore the prism needs to be a polarizing beam splitter. The beam, of which the light path is caused to oscillate by the scanning mirror 1204, is input to the polarizing beam splitter 1209 as S polarized light. A reflecting film inside the polarizing beam splitter 1209 is described so as to reflect S polarized light, and the S polarized light illuminates the LCOS panel 1210. The light reflected by the LCOS panel 1210 is projected onto a screen 1212 by a projection lens 1211.

The controller 1213 is constituted by a LCOS drive circuit 1214, an LD-galvano drive circuit 1215 and an LD current source 1216. A video signal VS is input to the LCOS drive circuit 1214 and the LCOS drive circuit 1214 generates a drive signal DS. The LD-galvano drive circuit 1215 is triggered by a V-SYNC signal Vsync, which is one of the signals from the LCOS drive circuit 1214, to generate a drive waveform for the scanning mirror and a light emission trigger LT which is a light emission timing for the laser. The light emission trigger LT is input to the LD current source 1216, which is a current source for the laser, and current is supplied to the blue laser light source 1201b, the red laser light source 1201r and the green laser light source 1201g, in accordance with the light emission trigger LT. By this series of operations, a composition is achieved in which an image is displayed on the screen 1212.

In the laser projector device 1200 described above, since the wavelength conversion laser light source according to the first or second embodiment is used as the green laser light source 1201g, then it is possible to ensure long-term stability of the light source output in a broad temperature range and hence it is possible to maintain stable brightness in a broad temperature range.

Fourth Embodiment

Figure 12:
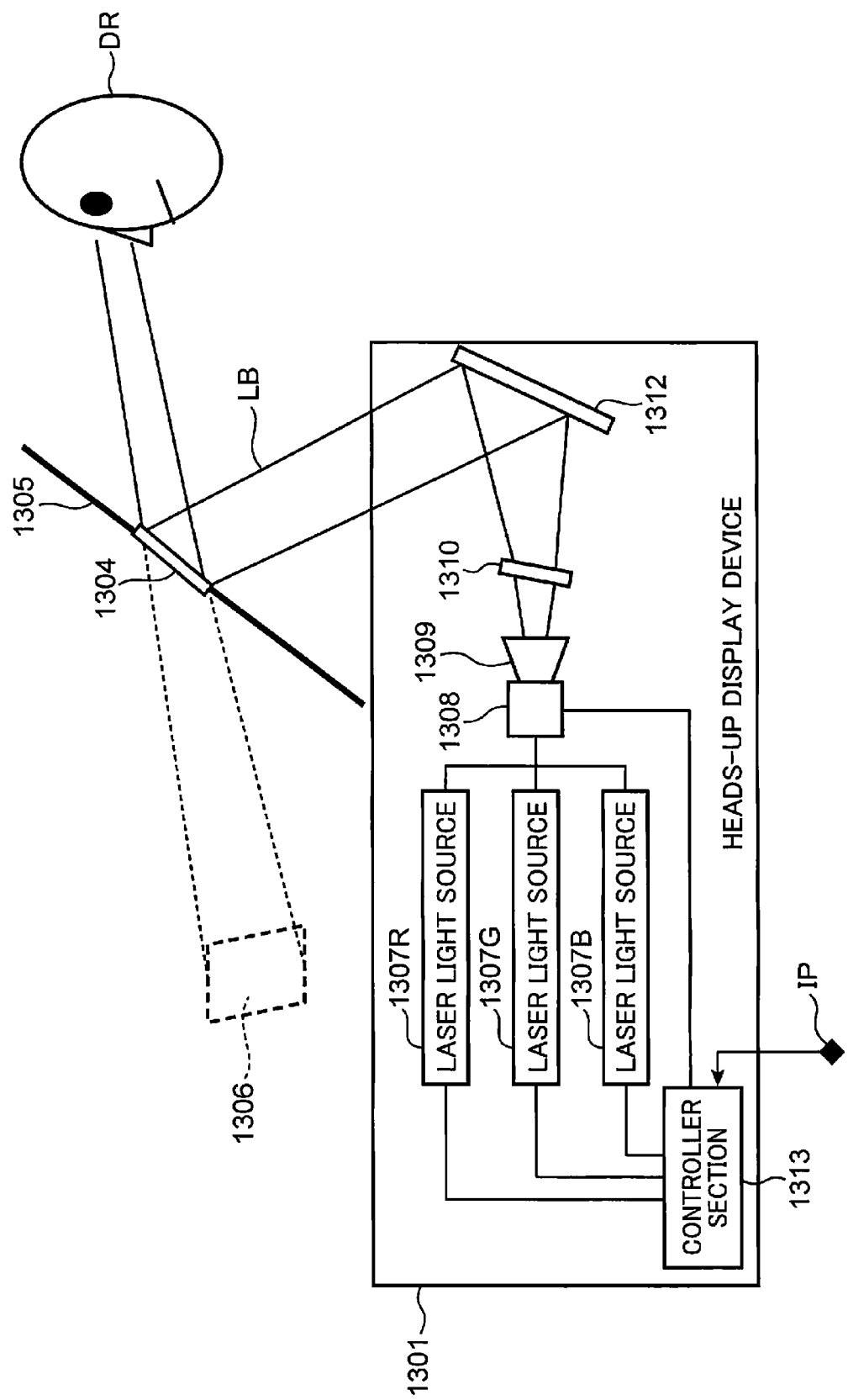
FIG. 12 is a schematic drawing showing a composition of a heads-up display device which uses a wavelength conversion laser light source according to the first or second embodiment of the present invention.

Next, a fourth embodiment of the invention will be described. The present embodiment is a second image display device which adapts the wavelength conversion laser light source according to the first or second embodiment. FIG. 12 is a schematic drawing showing a composition of a heads-up display device which uses a wavelength conversion laser light source according to the first or second embodiment of the present invention.

The heads-up display device 1301 shown in FIG. 12 is constituted by red, green and blue laser light sources 1307R, 1307G and 1307B, a two-dimensional modulation element 1308, a projection lens 1309, an intermediate screen 1310, a fold-back mirror 1312, and a controller section 1313 which controls these parts. The two-dimensional modulation element 1308 is constituted by a small liquid crystal panel or a digital mirror device (DMD). The wavelength conversion laser light source according to the first and second embodiments described above is used as the green laser light source 1307G.

The laser light emitted from the laser light sources 1307R, 1307G and 1037B is combined and shaped by an optical system (not illustrated) and illuminates the two-dimensional modulation element 1308. The light from the two-dimensional modulation element 1308 is projected onto the screen 1310 by the projection lens 1309 to form an image.

The image data that is to be displayed by the heads-up display device 1301 is input as an electrical signal from an external device (not illustrated), via an input port IP, and the controller section 1313 converts the image data into a drive signal of the two-dimensional modulation element 1308. Furthermore, the controller section 1313 generates a light-up timing signal for the laser light sources 1307R, 1307G and 1307B and causes the laser light sources 1307R, 1307G and 1307B to light up by supplying the required current to the laser light sources 1307R, 1307G and 1307B.

The light beam LB emitted from the heads-up display device 1301 is reflected by the reflecting mirror 1304 arranged on a front glass 1305, and reaches a driver DR. A set-up is achieved in which the driver DR is able to view the moving image formed by the light beam LB, as if the image were displayed at the location of the virtual image 1306. By this series of operations, a composition is achieved in which an image is displayed on the front glass 1305.

In the heads-up display device 1301 described above, since the wavelength conversion laser light source according to the first or second embodiment is used as the green laser light source 1307G, then it is possible to ensure long-term stability of the light source output in a broad temperature range and hence it is possible to maintain stable brightness in a broad temperature range.

A summary of the present invention from the embodiments described above is given below. More specifically, the wavelength conversion laser light source relating to the present invention comprises: a solid laser medium to which pump light is input and which generates a fundamental light wave; a wavelength conversion element which converts the fundamental light wave into a second harmonic light wave having a higher frequency than the frequency of the fundamental light wave; a concave mirror on which a first reflecting surface reflecting the fundamental light wave and the second harmonic light wave is formed; and a wavelength plate on which a second reflecting surface reflecting the fundamental light wave and transmitting the second harmonic light wave is formed; wherein a laser resonator is constituted by the first reflecting surface and the second reflecting surface; the solid laser medium is arranged on the first reflecting surface side of the laser resonator, the wavelength plate is arranged on the second reflecting surface side of the laser resonator, and the wavelength conversion element is arranged between the solid laser medium and the wavelength plate; and the wavelength plate outputs the second harmonic wave which has been converted by the wavelength conversion element, to the exterior of the laser resonator, via the second reflecting surface.

In the wavelength conversion laser light source, since the solid laser medium is arranged on the first reflecting surface side of the laser resonator; the wavelength plate is arranged on the second reflecting surface side of the laser resonator; the wavelength conversion element is arranged between the solid laser medium and the wavelength plate; and the second harmonic wave which has been converted by the wavelength conversion element is output to the exterior of the laser resonator, via the second reflecting surface, then it is possible to arrange the wavelength plate at the furthest position from the solid laser medium to which the pump light is input, inside the laser resonator, and temperature rise in the wavelength plate caused by the pump light can be suppressed. Therefore, in the wavelength conversion laser light source which has a wavelength plate inside the laser resonator, it is possible to suppress, by means of a simple composition, instability of the light output after wavelength conversion and failure to obtain a suitable output, which are issues when generating light of 200 mW or above, as a result of which it is possible to provide a small laser light source device which emits laser light having a high output.

Desirably, the first reflecting surface formed on the concave mirror reflects the fundamental light wave and condenses the fundamental light wave on the wavelength conversion element, and the second reflecting surface formed on the wavelength plate is a plane mirror.

In this case, since the fundamental light wave is condensed by the first reflecting surface and the condensed light is input to the wavelength conversion element, then it is possible to improve the conversion efficiency from the fundamental light wave to the harmonic light wave in the wavelength conversion element, and further since the second reflecting surface is a plane mirror, then it is possible readily to create the second reflecting surface in an integrated manner with the wavelength plate, in addition to which positional adjustment between the wavelength plate and the second reflecting surface is facilitated and the manufacturing costs of the device can be reduced.

Desirably, the second reflecting surface formed on the wavelength plate is exposed to external air.

In this case, since the wavelength plate is exposed to the external air via the second reflecting surface and the wavelength plate can be cooled efficiently by the external air, then an action of suppressing the rotation of polarization due to temperature rise in the wavelength plate is produced and the problem of instability in the output and shortfall in the output with respect to the expected output value can be reduced.

Desirably, a cooling section which cools the wavelength plate is also provided.

In this case, since the wavelength plate can be cooled efficiently by the cooling section, then it is possible to significantly improve the problem of instability in the output or shortfall in the output with respect to the expected output value, in a wavelength conversion laser light source in which a wavelength plate is inserted into a laser resonator.

Desirably, the cooling section is made from a metal film having a resistivity of not more than $1.0 \times 10^{-5}$ Ω·cm.

In this case, since the thermal conductivity of the metal film is raised and the wavelength plate can be cooled more efficiently, then it is possible to restrict the decline in the green light of the wavelength conversion laser light source having a wavelength plate inserted into the laser resonator, to no more than 5%.

Desirably, the cooling unit is made from diamond thin film or diamond-like carbon.

In this case, since the diamond thin film or diamond-like carbon is a transparent conductive material that can transmit light, then it is not necessary to provide an opening section for the second harmonic light wave, and the like, to pass through and the cooling efficiency of the portion where the second harmonic wave passes can be improved, thus making it possible to cool the wavelength plate more efficiently.

Desirably, the solid laser medium is made from an isotropic material having an isotropic refractive index.

In this case, it is possible reliably to diminish the problems of instability of the output and shortfall in the output with respect to the expected output value caused by a solid laser medium made from an isotropic material having an isotropic refractive index.

Desirably, the solid laser medium is made from a ceramic material having a depolarization effect.

In this case, it is possible reliably to diminish the problems of instability of the output and shortfall in the output with respect to the expected output value caused by a solid laser medium made from a ceramic material having a depolarization effect.

The wavelength conversion element is desirably made from any one of MgO-doped lithium niobate, MgO-doped lithium tantalite and potassium titanyl phosphate, and is desirably made from MgO-doped lithium niobate having a fixed composition ratio or MgO-doped lithium tantalite having a fixed composition ratio.

In this case, since the conversion efficiency from the fundamental light wave to the harmonic light wave in the wavelength conversion element can be improved, then the output of the wavelength conversion laser light source can also be improved.

The image display device relating to the present invention comprises: a laser light source which includes any one of the wavelength conversion laser light sources described above and generates laser light; a modulation element which forms an image by modulating the laser light; and a controller which controls the laser light source and the modulation element.

In this image display device, since a wavelength conversion laser light source is used, which is capable of outputting a second harmonic wave after wavelength conversion in a stable fashion at high output, even if a wavelength plate is inserted into the laser resonator, then it is possible to guarantee the long-term stability of the light source output in a broad temperature range, and stable brightness can be maintained in a broad temperature range.

According to the present invention, since decline in the output and instability in the output of green light due to generation of heat by a wavelength plate is prevented, and a compact wavelength conversion laser light source which emits a high output of no less than 1000 mW can be provided, then the wavelength conversion laser light source is suitable for use in a wavelength conversion laser device, or the like, which converts a fundamental light wave emitted by a solid laser medium into a second harmonic light wave having a frequency higher than the frequency of the fundamental light wave.

The invention claimed is:

1. A wavelength conversion laser light source, comprising:
   a pump light source;
   a solid laser medium to which pump light from the pump light source is input and which generates a fundamental light wave;
   a wavelength conversion element which converts the fundamental light wave into a second harmonic light wave having a higher frequency than the frequency of the fundamental light wave;
   a concave mirror on which a first reflecting surface reflecting the fundamental light wave and the second harmonic light wave is formed; and
   a wavelength plate on which an optical film is formed, wherein the optical film includes a second reflecting surface reflecting the fundamental light wave and transmitting the second harmonic light wave;
   a laser resonator is constituted by the first reflecting surface and the second reflecting surface;

the solid laser medium is arranged on the first reflecting surface side of the laser resonator, the wavelength plate is arranged on the second reflecting surface side of the laser resonator, and the wavelength conversion element is arranged between the solid laser medium and the wavelength plate;

the solid laser medium outputs light other than linearly polarized light as the fundamental light wave;

the light other than linearly polarized light is directly input from the solid laser medium to the wavelength conversion element; and the wavelength plate outputs the second harmonic wave converted by the wavelength conversion element to an exterior of the laser resonator via the second reflecting surface.

2. The wavelength conversion laser light source according to claim 1, wherein the first reflecting surface formed on the concave mirror reflects the fundamental light wave and condenses the fundamental light wave on the wavelength conversion element, and the second reflecting surface formed on the wavelength plate is a plane mirror.

3. The wavelength conversion laser light source according to claim 1, wherein the second reflecting surface formed on the wavelength plate is exposed to external air.

4. The wavelength conversion laser light source according to claim 1, further comprising a cooling section which cools the wavelength plate.

5. The wavelength conversion laser light source according to claim 4, wherein the cooling section is made from a metal film having a resistivity of not more than $1.0 \times 10^{-5}$ Ω·cm.

6. The wavelength conversion laser light source according to claim 4, wherein the cooling section is made from diamond thin film or diamond-like carbon.

7. The wavelength conversion laser light source according to claim 1, wherein the solid laser medium is made from an isotropic material having a refractive index that is isotropic.

8. The wavelength conversion laser light source according to claim 1, wherein the solid laser medium is made from a ceramic material having a depolarization effect.

9. The wavelength conversion laser light source according to claim 1, wherein the wavelength conversion element is made from any one of MgO-doped lithium niobate, MgO-doped lithium tantalite and potassium titanyl phosphate.

10. An image display device, comprising:
a laser light source which includes the wavelength conversion laser light source according to claim 1 and generates laser light;
a modulation element which forms an image by modulating the laser light; and
a controller which controls the laser light source and the modulation element.

* * * * *